United States Patent [19]

Rademachers et al.

[11] 4,235,861
[45] Nov. 25, 1980

[54] PRODUCTION OF IRON OXIDE PIGMENTS AND SODIUM SULPHATE

[75] Inventors: Jakob Rademachers, Krefeld; Ingo Pflugmacher, Meerbusch, both of Fed. Rep. of Germany

[73] Assignee: Bayer Aktiengesellschaft, Leverkusen, Fed. Rep. of Germany

[21] Appl. No.: 11,345

[22] Filed: Feb. 12, 1979

[30] Foreign Application Priority Data

Mar. 1, 1978 [DE] Fed. Rep. of Germany ....... 2808674

[51] Int. Cl.³ .......................... C01D 5/00; C01G 49/02
[52] U.S. Cl. ..................................... 423/551; 423/632
[58] Field of Search ......... 423/147, 632, 633, DIG. 2, 423/551; 23/300, 302 T

[56] References Cited
U.S. PATENT DOCUMENTS

| 3,706,531 | 12/1972 | Cozza et al. | 423/632 |
| 3,773,911 | 11/1973 | Cozza et al. | 423/551 |
| 3,987,156 | 10/1976 | Nobuoka | 423/551 |
| 4,173,624 | 11/1979 | Rademachers et al. | 423/551 |

Primary Examiner—O. R. Vertiz
Assistant Examiner—Gary P. Straub
Attorney, Agent, or Firm—Sprung, Felfe, Horn, Lynch & Kramer

[57] ABSTRACT

In the production of iron oxide pigments and substantially iron-free sodium sulphate from iron sulphate by passing an oxygen-containing gas through an alkalized iron sulphate-containing solution at a temperature of about 40° to 100° C., and separating iron oxide pigment formed from the solids-free sodium sulphate-containing solution, the improvement of which comprises crystallizing out part of the sodium sulphate from the solids-free solution in a first crystallization step, separating the crystals from the sodium sulphate-containing mother liquor, dividing the mother liquor into first and second portions, dissolving solid iron sulphate hydrate in the first portion, adding to the second portion sodium hydroxide thereby to crystallize additional sodium sulphate, separating the additional crystals of sodium sulphate from the rest of the mother liquor, and using the rest of the mother liquor containing sodium sulphate and sodium hydroxide to alkalize further iron sulphate solution in the precipitation of further iron oxide pigment.

3 Claims, 1 Drawing Figure

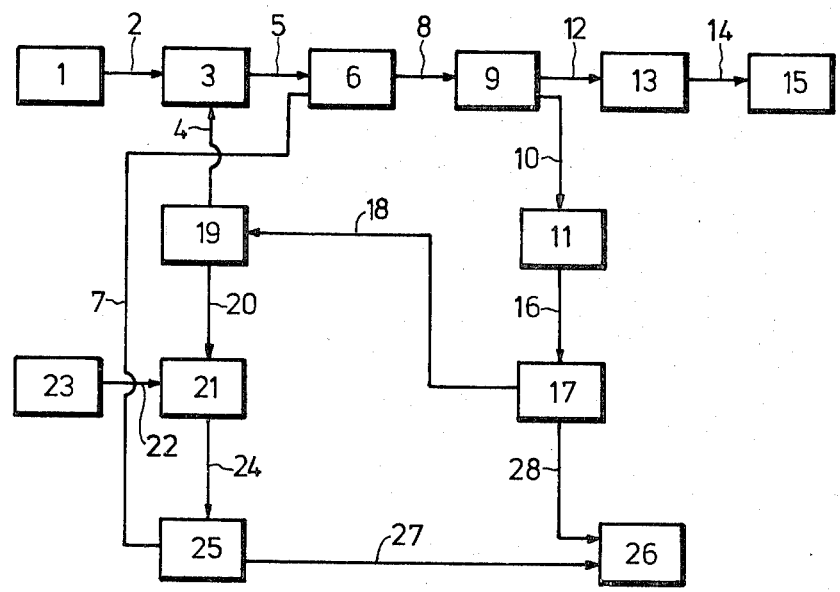

PRODUCTION OF IRON OXIDE PIGMENTS AND SODIUM SULPHATE

The production of iron oxide pigments from iron sulphate is known. In one known process, for example, sodium hydroxide is added to an aqueous iron sulphate solution, accompanied or followed by oxidation, for example by aeration, at elevated temperature in order subsequently to separate the iron oxide pigment sludges obtained from the sodium sulphate solution by filtration (C. C. De Witt et al: Pigment Grade Iron Oxides, Ind. Eng. Chem. Vol. 44, No. 3, pages 673 to 678 (1952)). The sodium sulphate may be crystallized through concentration by evaporation. In a further development of this process, it is possible by increasing the concentration of sodium sulphate in the filtered solutions partly to replace the energy-consuming concentration by evaporation by cooling the hot filtrates as they accumulate. In this way, it is possible to recover from about 60 70%, by weight, of the dissolved sodium sulphate without expending any thermal energy. Enrichment of the sodium sulphate in the hot pigment suspension is obtained either by increasing the initial concentrations or the iron sulphate solution and the sodium hydroxide to beyond the normal level, in which case the starting substances are in danger of crystallizing (U.S. Pat. No. 3,970,738), or by recycling the sodium sulphate-containing mother liquors which are cooled to room temperature and still contain about 250 g/l of sodium sulphate (Application Ser. No. 882,679, filed Mar. 25, 1977 now U.S. Pat. No. 4,173,624).

One object of the present invention is to process iron sulphate into high-quality pigment-grade iron oxides and substantially iron-free sodium sulphate. Another object of the present invention is to produce high-quality iron oxide pigments and substantially iron-free sodium sulphate from iron sulphate wastes of the type obtained in aqueous solution or as crystalline heptahydrate in the steel industry during pickling using sulphuric acid or in the chemical industry in the production of titanium dioxide pigments by breaking down titanium-iron ores using sulphuric acid.

According to U.S. Pat. No. 3,706,531, the solubility of sodium sulphate in the solution filtered from iron hydroxide is reduced not by cooling or by concentration by evaporation, but instead by the addition of sodium hydroxide. Thereafter, the solid iron sulphate heptahydrate is introduced into the sodium hydroxide-containing sodium sulphate solution freed from crystallized sodium sulphate. The iron hydroxide is actually formed during the dissolution process which is extremely unfavorable for the formation of iron oxide pigments. Control of particle size, which is so important to the quality of the pigment, is not possible unless solutions of predetermined concentration are used for precipitation. For this reason, no pigments are produced by this known process, instead all that is mentioned is the harmless elimination of iron hydroxides formed.

The present invention relates to a process for the production of iron oxide pigments and substantially iron-free sodium sulphate from iron sulphate by passing an oxygen-containing gas, particularly air, through alkalized iron sulphate-containing solutions at temperatures of from about 40 to about 100° C., the iron oxide pigment formed being separated from the sodium sulphate-containing solution, characterized in that, in a first crystallization step, part of the sodium sulphate is allowed to crystallize out from the solids-free solution and is separated off from the sodium sulphate-containing mother liquor, part of the sodium sulphate-containing mother liquor is used for dissolving solid iron sulphate hydrate and more sodium sulphate is crystallized from the rest of the mother liquor by the addition of sodium hydroxide and separated off, after which the sodium sulphate- and alkali-containing aqueous solution formed is used as alkaline precipitant for the formation of iron oxide pigment.

The process according to the present invention is carried out at an alkaline pH, i.e. at a pH of from about 7 to 14, preferably about 9 to 11, the iron being completely precipitated in oxide or hydroxide form. In this way, iron oxide black pigments of magnetite structure corresponding to the formula $Fe_3O_4$ are generally formed, although goethite having the chemical composition FeOOH may also be obtained providing temperatures of from about 60° to 100° C. and pH values of from about 12 to 14 are maintained. Iron oxide hydroxides obtained in this way have an acicular structure. They are yellow to brown in color and are preferably used as starting material in the production of magnetogram supports.

The process according to the present invention may be carried out particularly effectively using iron sulphate wastes.

After cooling of the solution filtered from the pigment sludge, the sodium sulphate decahydrate which crystallizes out accumulates in pure, substantially iron-free form. In the second crystallization step after the solubility of the sodium sulphate has been reduced by the addition of sodium hydroxide, the pure sodium sulphate is obtained after additional washing.

Advantageously the first crystallization of sodium sulphate is carried out to crystallize out about 30 to 35% of the sodium sulphate to a residual sodium sulphate concentration in the mother liquor of about 16 to 24% and preferably about 20 to 22%. About 70 to 90% and preferably about 78 to 80% of this mother liquor is used for dissolving solid iron sulphate hydrate, about 20 to 35% and preferably about 28 to 32% by weight of iron sulphate hydrate being dissolved in the solution. To the balance of the mother liquor sodium hydroxide is added in from about 40 to 60% and preferably about 45 to 50%. The second sodium sulphate crystallization is carried out to a residual sodium sulphate concentration in the liquor of about 0,5 to 4% and preferably about 1 to 2%.

One embodiment of the process according to the present invention is described in detail with reference to the accompanying drawing wherein the sole FIGURE is a flow sheet of the process.

In the drawing, the reference numerals used have the following meanings: 1,23 = storage containers, 2,4,5,7,8,10,12,14,16,18,20,22,24,27,28 = pipes, 3 = dissolution vessel, 6 = reactor, 9 = filtration unit, 11,21 = crystallization units, 13 = washer, 15 = dryer, 17,25 = centrifuges, 19 = collecting vessel, 26 = storage container.

In the illustrated embodiment, the starting material used is iron sulphate heptahydrate. It passes from the storage container 1 through the pipe 2 to the dissolution vessel 3 which is equipped with a stirrer. Here the iron sulphate is dissolved by the addition of part of the sodium sulphate-containing mother liquor emanating from the first crystallization stage 11, 17 from the collecting vessel 19, optionally after slight acidification with sulphuric acid, introduced through the pipe 4. The thus-formed solution then enters the reactor 6 through the pipe 5, the alkali solution from the second crystallization stage 21, 25 being added as precipitant to the reactor 6 through the pipe 7. The pigment is formed in the reactor 6 by passing air through at temperatures of from above 40° to about 100° C. and at a pH of from 7 to 14. A pH of from 9 to 11 is preferably maintained for black pigments, while a pH of about 12 to 14 is preferably maintained for yellow pigments or for starting products for magnetite pigments. On completion of pigment formation, which may be carried out continuously or in batches, the pigment suspension is filtered in 9, the filtrate flowing through 10 into the low temperature crystallization unit 11. The filter cake is washed in 13 and dried in 15.

The sodium sulphate decahydrate separated out in the crystallization unit 11 on cooling to room temperature is separated from the mother liquor in a centrifuge 17. It accumulates in a quantity which is suitable for further processing, optionally after recrystallization, into anhydrous salt for the detergent or paper industry and for the textile industry.

The mother liquor from this first crystallization stage is then delivered through the pipe 18 to the collecting vessel 19, from which some of it is returned through pipe 4 to the dissolution vessel 13. Some more of the mother liquor (about 20%) has sodium hydroxide added to it from the storage container 23 in the crystallization unit 21. The anhydrous sodium sulphate separated out is centrifuged off in 25, the mother liquor from this second crystallization stage being delivered through pipe 7 to reactor 6 as alkali solution for the pigment-forming process. The sodium hydroxide-containing crystals centrifuged off are washed in the centrifuge with water containing sodium sulphate and, in the same way as the Glauber's salt from 17, are loaded into the storage container 26.

The individual process steps may be varied and modified without disadvantages in accordance with the prior art. For example, it is possible for the oxidation reaction with air for pigment formation in the reactor 6 to be carried out by any of the various methods of aeration known from fermentation or from the biological treatment of effluents.

The solid-liquid separations in the units 9, 17 and 25 may be carried out continuously or in batches using vacuum filters, pressure filters, centrifuges or other apparatus known from chemical process engineering.

The process according to the present invention is illustrated by the following example:

400 parts, by weight, of iron sulphate heptahydrate resulting from the production of titanium dioxide are dissolved in dissolution vessel 3 with 950 parts, by weight, of mother liquor containing 250 g/l of $Na_2SO_4$. The iron oxide is precipitated from this solution in the form of black $Fe_3O_4$ in the aeration vessel 6 by the addition of 430 parts, by weight, of the alkali solution from centrifuge 25, containing 115 parts, by weight, of NaOH and 7 parts, by weight, of $Na_2SO_4$, with finely disperse aeration. The reaction temperature is maintained at 70° C. A pH of from 9 to 10 is spontaneously established on completion of the reaction, recognizable from the iron(II) to iron(III) ratio, which should amount to 1:1.9, the $Fe_3O_4$ formed is filtered in a rotary vacuum filter 9, re-suspended and washed in washer 13 and dried in dryer 15. After grinding, 100 parts, by weight, of an intensively colored deep black iron oxide pigment are obtained which is suitable for pigmenting purposes both in the lacquer industry and in the construction industry.

The filtrate accumulating in filter 9 contains 380 g/l of $Na_2SO_4$. It is cooled to 25° C. by vacuum cooling in crystallization unit 11, 330 parts, by weight, of $Na_2SO_4$. 10 $H_2O$ crystallizing out and being centrifuged off in the centrifuge 17. The crystals obtained are pure white in color. They contain less than 0.005%, by weight, of iron and 38%, by weight, of $Na_2SO_4$.

While 950 parts, by weight, of the mother liquor obtained are used for dissolving more iron sulphate in the agitation vessel 3, 250 parts, by weight, enter the second crystallization stage 21 where 235 parts, by weight, of a 50% sodium hydroxide solution are added to them. 55 parts, by weight, of $Na_2SO_4$ crystals are obtained. After centrifuging, they still contain 2 parts, by weight, of NaOH and 5 parts, by weight, of adhering water. A pure NaOH-free end product is obtained after washing with water containing $Na_2SO_4$.

It will be appreciated that the instant specification and examples are set forth by way of illustration and not limitation, and that various modifications and changes may be made without departing from the spirit and scope of the present invention.

We claim:

1. A process for producing iron oxide suitable for pigment production and sodium sulphate, comprising dissolving iron sulphate in a solution of sodium sulphate, alkalizing and aerating said solution to convert the iron therein into a solid iron oxide suitable for pigment production and forming sodium sulphate solution, separating the iron oxide, crystallizing a part of the sodium sulfate out of the sodium sulphate solution to leave a mother liquor, subdividing the mother liquor into first and second portions, utilizing the first portion to dissolve the iron sulphate feed, treating the second portion with sodium hydroxide to crystallize out additional sodium sulphate and to form a sodium hydroxide- and sodium sulphate-containing solution which is used for alkalizing the initial iron sulphate solution.

2. A process according to claim 1, wherein in the first crystallization step are separated from about 60 to 80% by weight of the total crystallized sodium sulphate of both crystallization steps.

3. A process according to claim 1, wherein the first portion is from 70 to 90% of the total of the first plus second portions.

* * * * *